United States Patent
Yamasaki et al.

[15] 3,699,224
[45] Oct. 17, 1972

[54] METHOD FOR PROMOTION OF GROWTH OF CULTURED FISH

[72] Inventors: Masaaki Yamasaki, 3, Mukomotomachi 3-chome, Amagasaki, Hyogo; Kuniyoshi Fujie, 32-349, Nampeidai, Takatsuki, Osaka; Haruo Fukui, 520, Yamada-shimo, Suita, Osaka, all of Japan

[22] Filed: May 20, 1969

[21] Appl. No.: 826,288

[30] Foreign Application Priority Data

May 24, 1968 Japan ......................43/34776

[52] U.S. Cl...................................424/181, 119/3

[51] Int. Cl. ...........................................A61k 21/00
[58] Field of Search .........................424/181; 119/3

[56] References Cited

OTHER PUBLICATIONS

Snieszko, Antibiotics & Chemotherapy, Vol. 9 (1959) pp. 541– 543.

*Primary Examiner*—Sam Rosen
*Attorney*—Everet F. Smith and Dwight E. Morrison

[57] ABSTRACT

Rate of growth of cultured fish is increased by the use of fish food containing macrolide antibiotics.

4 Claims, No Drawings

METHOD FOR PROMOTION OF GROWTH OF CULTURED FISH

BACKGROUND OF THE INVENTION

In recent years, the cultivation of fresh water fish, such as trout, carp, eel and mountain trout, as well as sea water fish, such as Hamachi, globe fish, sea bream, shrimp (prawn), and the like, has assumed commercial importance. The type of fish food utilized depends on the species of fish cultivated, the differing nutritional requirements of the various species, as well as economic considerations determining the type of food employed in a given case. As a result, various combinations of materials, such as raw fish, fish meal, chrysalis, vegetable oil meal, flour, powdered skim milk, yeast, bran, fish viscera, vitamins, and various kinds of oil and fats have been used as feed for the cultured fish.

SUMMARY

This invention is directed to a method for promoting the growth of cultured fish. More particularly, this invention is directed to a method for promoting the growth of cultured fish through the use of macrolide antibiotics.

DESCRIPTION

It has now been unexpectedly found that the administration of macrolide antibiotics to fish, preferably by addition of such antibiotics to fish food, improves feed efficiency and promotes the growth of cultured fish.

It is an object of this invention to provide a method for promoting the growth of cultured fish by the addition of a sufficient amount of a macrolide antibiotic to the fish food. It is a further object of this invention to provide growth-promoting mixtures of fish food comprising a macrolide antibiotic and any kind of feed designed for administration to cultured fish.

Growth-promoting substances suitable for use in this invention include oleandomycin, triacetyl oleandomycin, erythromycin, leucomycin, carbomycin, pikromycin, spiramycin, and tylosin, and the first order derivatives and salts of the foregoing antibiotics.

First order derivatives of the macrolide antibiotics are readily prepared by methods well known in the art, for example, by acylation, by hydrogenation, as well as by preparation of the well-known derivatives of carbonyl groups present in the macrolide antibiotic molecule, derivatives such as oximes, hydrazones, semicarbazones, thiosemicarbazones, bisulfite addition products, and the like. The procedures lead to such products as diacetylleucomycin, propionylleucomycin, tetrahydroleucomycin, erythomycin propionate and the like, all useful in the practice of the instant invention. Acid addition salts of the macrolide antibiotics likewise are prepared by methods well known to the art through the use of both organic and inorganic acids chosen to yield acid addition salts of the macrolide antibiotics possessing toxicities comparable to the usual toxicity possessed by the antibiotic free bases. Acids suitable for use in preparing acid addition salts are exemplified by hydrochloric, hydriodic, hydrobromic, sulfuric, nitric, tartaric, glucoheptonic, stearic, lactobionic, maleic, benzoic, adipic, laurylsulfonic, and like acids.

Suitably, these macrolide antibiotics, derivatives or salts are used singly or in the form of combinations of one or more of the pure antibiotics; in the form of a concentrated extract of the fermentation mixture wherein the antibiotic was produced; in the form of the micro-organism which produces the particular macrolide antibiotic; or in the form of crude materials containing the macrolide antibiotics.

The effective dosage of macrolide antibiotics will vary with the species of fish, with the method of administering the antibiotic to the fish, with the type of food employed when the antibiotic is administered as part of the feed, and with the feed intake of the fish species. Suitably, a dosage of the macrolide antibiotic of from about 1 mg. to about 500 mg. per kilogram of body weight of fish, preferably from about 2 mg. to about 100 mg. per kilogram of body weight of fish, is employed to promote optimum weight gain. While a dosage of the macrolide antibiotic below the lower limit generally is less effective in promoting weight gain, a dosage level higher than that required for optimum weight gain produces no adverse effect on the fish.

The macrolide antibiotics useful in this invention may be readily incorporated into the fish food by premixing one or more of the antibiotics in commercial food during the usual preparation and processing thereof; or by adding measured amounts of one or more of the antibiotics to food, prepared immediately prior to each feeding. In either case, the incorporation is suitably accomplished by simple mixing or by soaking the food in a solution of the macrolide antibiotic; or by spraying the food with a liquid preparation of the macrolide antibiotic.

To minimize the possibility of loss in water due to solubility therein of the macrolide antibiotics, the antibiotics are preferably mixed or coated with non-toxic vehicles and adhesive substances to add bulk or provide a relatively water insoluble coating. Substances such as lactose, calcium carbonate, soybean phospholipids, cellulose, alyginate methylcellulose, carboxymethyl cellulose, polyacrylic acid, polyvinylpyrrolidone, and the like can be employed for this purpose. The macrolide antibiotics can also be suitably prepared for use in the form of powders, granules or pellets.

That the practice of the invention may be more clearly understood, the following examples are included. The scope of the invention, however, is not to be considered as being limited thereby.

EXAMPLE 1

The effect of tylosin on the growth of cultured Hamachi fish was determined as described below (Hamachi is a specific designation for younger stage fish of the Yellow Tail [*Seriola quingueradiata*] variety).

A total of 1,000 fish were divided into two groups of 500 fish each and kept in sea water in fish-culturing nets. One group served as the control group and the other received tylosin incorporated into its food ration. The standard ratio was comprised of dried fish food and ground frozen fish, such as sardine and mackerel. The ration was mixed prior to each feeding and thrown into the sea water inside the fenced-in nets. The total amount of the ration required per day was calculated to be about 30 percent of the total body weight of the cultured fish. The control group received the standard ration, while the treated group received the standard ratio with tylosin mixed or incorporated therein at the rate of 226 mg. of tylosin base/kg. of body weight of fish per day. The tylosin used was in the form of gelatinized tylosin phosphate, 1000 mg. of which corresponds to 226 mg. of tylosin base. The experiment was conducted for a total period of 21 days. The results are shown in Table I.

TABLE I

| Start of trial | Tylosin treated group | Control group |
|---|---|---|
| No. of fish | 500 | 500 |
| Average wt./fish | 10.7 gm. | 10.6 gm. |
| Total weight | 5.35 kg. | 5.3 kg. |
| No. of fish died during trial | 33 | 28 |
| No. of fish removed for autopsy | 40 | 40 |
| At the termination of trail | | |
| No. of fish | 427 | 432 |
| Average wt./fish | 37.6 gm. | 35.1 gm. |
| Total weight | 16.05 kg. | 15.15 kg. |
| Total weight gain | 10.7 kg. | 9.85 kg. |
| Total weight of feed used | 71.81 kg. | 71.81 kg. |
| Feed Efficiency (kg. gained/kg. used × 100 %) | 14.9 percent | 13.7 pecent |
| Feed Requirement (kg. used/kg. gained) | 6.71 | 7.29 |
| Average daily gain/ fish | 1.28 gm. | 1.17 gm. |

EXAMPLE 2

In this example, the effect of tylosin on the growth of cultured fish was carried out using 300 fish of equal size, the total composed of 150 fish from each of the medicated group and the control group of Example 1. The study was conducted for a period of 11 days using a dosage level of tylosin of 22.6 mg/kg. of body weight of fish per day. The tylosin used was in the form of gelatinized tylosin phosphate, 100 mg. of which corresponds to 22.6 mg. of tylosin base. The results are shown in Table 2.

TABLE 2

| At start of trial | Tylosin medicated group | Control group |
|---|---|---|
| No. of fish | 150 | 150 |
| Average wt./fish | 55.3 gm. | 54.7 gm. |
| Total weight | 8.3 kg. | 8.2 kg. |
| At the termination of trial | | |
| No. of fish | 150 | 150 |
| Average wt./fish | 92.3 gm. | 85.0 gm. |
| Total weight | 13.85 kg. | 13.75 kg. |
| Total weight gain | 5.55 kg. | 4.55 kg. |
| Total weight of feed used | 33.0 kg. | 32.6 kg. |
| Feed Efficiency (kg. gained/kg. used × 100 %) | 16.8 percent | 14.0 percent |
| Feed Requirement kg. used/kg. gained) | 5.95 | 7.15 |
| Average daily gain/ fish | 3.36 gm. | 2.75 gm. |

The effect of macrolide antibiotics on growth promotion of carp (*Cyprinus carpio*) was studied.

The carp, having an average weight of 10 gm., were kept in running water tanks, the water temperature being kept at about 24° C. Each of the 9 tanks contained 25 carp which were fed a standardized ration composed of the following ingredients: white fish meal (70 percent), wheat flour (16 percent), active gluten (3 percent), cornstarch (5 percent), and a commercial premix containing multiple vitamins and nitrofurazone. The fish in each tank received a food mixture comprising the above-described ration and the specific test material to be fed to the fish in that tank, as indicated in the following list:

| Tank | Testing material | Dosage (per 100 gm. of ration) |
|---|---|---|
| 1 | None (negative control) | |
| 2 | Tylocine premix AF-40 | 0.23 g. (20.2 mg.) |
| 3 | Tylocine premix AF-40 | 0.14 g. (100 mg.) |
| 4 | None (negative control) | |
| 5 | Tylocine premix AF-40 | 0.12 g. (10.6 mg.) |
| 6 | Tylocine premix AF-40 | 0.29 g. (25.5 mg.) |
| 7 | Tylosin | 100 mg. potency |
| 8 | Acetyl-spiramycin | 100 mg. potency |
| 9 | Erythromycin | 100 mg. potency |

Note: Bracketted value shows potency

Feeding was accomplished by dampening or moistening 3–4 gm. of the dried food just prior to each feeding and then feeding the carp with the thus-prepared ration. Feeding took place twice daily for a period of 25 days. The results are shown in Table 3.

TABLE 3

| Tank | 1 | 2 | 3 | 4 | 5 | 6 | 7 | 8 | 9 |
|---|---|---|---|---|---|---|---|---|---|
| at the start Total fish wt. gm. | 268 | 270 | 264 | 268 | 263 | 263 | 268 | 257 | 253 |
| Av. wt./fish | 10.75 | 10.80 | 10.56 | 10.75 | 10.52 | 10.52 | 10.75 | 10.38 | 10.12 |
| Intermediate Total fish wt. gm. | 292 | 308 | 308 | 296 | 306 | 298 | 306 | 302 | 293 |
| Av. wt./fish gm. | 11.68 | 12.32 | 12.32 | 11.84 | 12.24 | 11.81 | 12.24 | 12.08 | 11.72 |
| Wt. gain gm. | 24 | 38 | 44 | 26 | 43 | 35 | 38 | 45 | 40 |
| At termination Total fish wt. gm. | 332 | 361 | 364 | 334 | 350 | 358 | 357 | 358 | 352 |
| Av. wt./fish gm. | 13.28 | 14.45 | 14.56 | 13.36 | 14.00 | 14.32 | 14.28 | 14.32 | 14.08 |
| Total weight gain gm. | 64 | 91 | 100 | 66 | 87 | 95 | 89 | 101 | 99 |
| Total feed |

| | | | | | | | | | |
|---|---|---|---|---|---|---|---|---|---|
| consumed** | 151 | 151 | 151 | 151 | 151 | 151 | 151 | 151 | 151 |
| Feed efficiency (%) | 42 | 60 | 66 | 44 | 53 | 63 | 59 | 67 | 66 |

Note: ** As dry feed.

EXAMPLE 4

The effect of macrolide antibiotics as growth promoters was conducted using carp (Cyprinus carpio) weighing about 20 gm. each. Eighty-four carp were divided into seven groups of 12 carp each, each group being kept in a separate tank in the same type facilities as used in Example 3. The same basic ration described in Example 3 was used in Example 4 with the following testing materials for each specific group added to the basic ration:

| Group | Testing Material | Dosage per 100 percent of ration |
|---|---|---|
| 1 and 2 | None (negative control) | |
| 3 | Aureomycin | 107 mg. (potency) |
| 4 | Tylocine premix AF-40 | 150 mg. (13.2 mg. potency) |
| 5 | Tylocine premix AF-40 | 600 mg. (52.8 mg. potency) |
| 6 | Oleandomycin | 50 mg. (potency) |
| 7 | Leucomycin | 100 mg. (potency) |

Feeding was accomplished by dampening or moistening about 2 gm. of the dried feed just prior to each feeding. The fish were fed such a preparation twice daily.

During a period of 11 days (nonmedicated period), the fish were fed the basic ration to which no antibiotics had been added. At the end of the non-medicated period, the antibiotics were incorporated into the feed and the fish fed for an additional period of 11 days. The results are shown in Table 4.

TABLE 4

| Group | 1 | 2 | 3 | 4 | 5 | 6 | 7 |
|---|---|---|---|---|---|---|---|
| Non-medication period | | | | | | | |
| Total fish wt. | | | | | | | |
| at start gm. | 234 | 242 | 239 | 244 | 242 | 236 | 240 |
| at termination gm. | 253 | 260 | 259 | 262 | 260 | 256 | 259 |
| Weight gain gm. | 19 | 18 | 20 | 18 | 18 | 20 | 19 |
| Medication period | | | | | | | |
| Total fish wt. | | | | | | | |
| at start gm. | 253 | 260 | 259 | 262 | 260 | 256 | 259 |
| at termination gm. | 273 | 281 | 278 | 283 | 289 | 279 | 286 |
| Weight gain | 20 | 21 | 19 | 21 | 29 | 23 | 27 |
| Total feed consumed | 36 | 36 | 36 | 36 | 36 | 36 | 36 |
| Radio of weight gain | 100 | 105 | 95 | 105 | 145 | 115 | 135 |

We claim:

1. The method of promoting the growth of cultured fish which comprises orally administering thereto a growth-promoting amount of at least one macrolide antibiotic selected from the group consisting of oleandomycin, triacetyl oleandomycin, erythromycin, leucomycin, carbomycin, pikromycin, spiramycin, tylosin, the first order derivatives thereof selected from the group consisting of acylates, hydrozones, oximes, semicarbazones, thiosemicarbazones, bisulfite addition products, and tetrahydro hydrogenation products, and acid addition salts.

2. The method of claim 1 wherein the macrolide antibiotic is tylosin.

3. The method of claim 1 wherein the macrolide antibiotic is oleandomycin.

4. The method of claim 1 wherein the macrolide antibiotic is leucomycin.

* * * * *